ized Patent No.: US 9,452,719 B2

(12) United States Patent
Chauhan et al.

(10) Patent No.: US 9,452,719 B2
(45) Date of Patent: Sep. 27, 2016

(54) HIGH TEMPERATURE RESISTANT INSULATION MAT

(71) Applicant: Unifrax I LLC, Tonawanda, NY (US)

(72) Inventors: Digvijay Singh Chauhan, Buffalo, NY (US); Amit Kumar, Getzville, NY (US); Thomas S. Lacki, Alden, NY (US)

(73) Assignee: Unifrax I LLC, Tonawanda, NY (US)

( * ) Notice: Subject to any disclaimer, the term of this patent is extended or adjusted under 35 U.S.C. 154(b) by 0 days.

(21) Appl. No.: 14/845,984

(22) Filed: Sep. 4, 2015

(65) Prior Publication Data

US 2016/0244001 A1 Aug. 25, 2016

Related U.S. Application Data

(60) Provisional application No. 62/183,368, filed on Jun. 23, 2015, provisional application No. 62/120,133, filed on Feb. 24, 2015.

(51) Int. Cl.
*D04H 1/42* (2012.01)
*B60R 13/08* (2006.01)

(52) U.S. Cl.
CPC ................. *B60R 13/0876* (2013.01)

(58) Field of Classification Search
CPC .......... D04H 1/42; D04H 1/46; B01D 39/40; F01N 3/24; C03C 13/00
USPC ........................................................ 162/145
See application file for complete search history.

(56) References Cited

U.S. PATENT DOCUMENTS

| 2,624,658 A | 1/1953 | Parker et al. |
| 3,224,927 A | 12/1965 | Brown et al. |
| 3,458,329 A | 7/1969 | Owens et al. |
| 3,649,406 A | 3/1972 | McNish |

(Continued)

FOREIGN PATENT DOCUMENTS

| DE | 196 38 542 A1 | 3/1997 |
| EP | 0 205 704 A1 | 12/1986 |

(Continued)

OTHER PUBLICATIONS

English language abstract of DE 19858025; Publication Date: Jun. 21, 2000; Applicant: Aslgawo GmbH.

(Continued)

*Primary Examiner* — Mark Halpern
(74) *Attorney, Agent, or Firm* — Curatolo Sidoti Co., LPA; Joseph G. Curatolo; Vincent A. Cortese

(57) ABSTRACT

Methods of forming insulation mats including: providing a mixture of fibers comprising first inorganic fibers and second inorganic fibers, wherein the first inorganic fibers shrink by no more than about 2 percent and the second fibers shrink by about 5 to about 15 percent when the mixture of fibers is heat treated; wet-forming a web of fibers from the mixture of fibers; entangling the web of fibers to form an insulation mat; heat-treating the insulation mat; and drying the web of fibers and/or the insulation mat after said wet-forming and prior to or during said heat treating; and wherein the insulation mat includes substantially no non-fibrous binder material prior to said heat treating the insulation mat at a temperature of from about 500° C. to about 800° C., optionally for at least about 3 minutes. Insulation mats manufactured according to the above methods.

22 Claims, 1 Drawing Sheet

(56) References Cited

U.S. PATENT DOCUMENTS

| | | |
|---|---|---|
| 3,771,967 A | 11/1973 | Nowak |
| 3,798,006 A | 3/1974 | Balluff |
| 3,916,057 A | 10/1975 | Hatch et al. |
| 3,996,145 A | 12/1976 | Hepburn |
| 4,026,381 A | 5/1977 | Conley |
| 4,048,363 A | 9/1977 | Langer et al. |
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,204,907 A | 5/1980 | Korklan et al. |
| 4,239,733 A | 12/1980 | Foster et al. |
| 4,269,807 A | 5/1981 | Bailey et al. |
| 4,271,228 A | 6/1981 | Foster et al. |
| 4,279,864 A | 7/1981 | Nara et al. |
| 4,305,992 A | 12/1981 | Langer et al. |
| 4,328,187 A | 5/1982 | Musall et al. |
| 4,332,852 A | 6/1982 | Korklan et al. |
| 4,335,077 A | 6/1982 | Santiago et al. |
| 4,345,430 A | 8/1982 | Pallo et al. |
| 4,353,872 A | 10/1982 | Midorikawa |
| 4,385,135 A | 5/1983 | Langer et al. |
| 4,617,176 A | 10/1986 | Merry |
| 4,693,338 A | 9/1987 | Clerc |
| 4,735,757 A | 4/1988 | Yamamoto et al. |
| 4,746,570 A | 5/1988 | Suzaki et al. |
| 4,752,515 A | 6/1988 | Hosoi et al. |
| 4,797,263 A | 1/1989 | Oza |
| 4,863,700 A | 9/1989 | Ten Eyck |
| 4,865,818 A | 9/1989 | Merry et al. |
| 4,927,608 A | 5/1990 | Wörner et al. |
| 4,929,429 A | 5/1990 | Merry |
| 4,985,212 A | 1/1991 | Kawakami et al. |
| 4,999,168 A | 3/1991 | Ten Eyck |
| 5,004,018 A | 4/1991 | Bainbridge |
| 5,008,086 A | 4/1991 | Merry |
| 5,024,289 A | 6/1991 | Merry |
| 5,032,441 A | 7/1991 | Ten Eyck et al. |
| 5,073,432 A | 12/1991 | Horikawa et al. |
| 5,079,280 A | 1/1992 | Yang et al. |
| 5,092,122 A | 3/1992 | Bainbridge |
| 5,094,073 A | 3/1992 | Worner et al. |
| 5,094,074 A | 3/1992 | Nishizawa et al. |
| 5,119,551 A | 6/1992 | Abbott |
| 5,134,846 A | 8/1992 | White |
| 5,145,811 A | 9/1992 | Lintz et al. |
| 5,151,253 A | 9/1992 | Merry et al. |
| 5,163,289 A | 11/1992 | Bainbridge |
| 5,167,430 A | 12/1992 | Bainbridge |
| 5,242,871 A | 9/1993 | Hashimoto et al. |
| 5,250,269 A | 10/1993 | Langer |
| 5,254,410 A | 10/1993 | Langer et al. |
| 5,258,216 A | 11/1993 | Von Bonin et al. |
| 5,290,522 A | 3/1994 | Rogers et al. |
| 5,293,743 A | 3/1994 | Usleman et al. |
| 5,332,609 A | 7/1994 | Corn |
| 5,332,699 A | 7/1994 | Olds et al. |
| 5,340,643 A | 8/1994 | Ou et al. |
| 5,346,868 A | 9/1994 | Eschner |
| 5,376,341 A | 12/1994 | Gulati |
| 5,380,580 A | 1/1995 | Rogers et al. |
| 5,384,188 A | 1/1995 | Lebold et al. |
| 5,389,716 A | 2/1995 | Graves |
| 5,400,830 A | 3/1995 | Stiles et al. |
| 5,453,116 A | 9/1995 | Fischer et al. |
| 5,482,686 A | 1/1996 | Lebold et al. |
| 5,488,826 A | 2/1996 | Paas |
| 5,523,059 A | 6/1996 | Langer |
| 5,580,532 A | 12/1996 | Robinson et al. |
| 5,585,312 A | 12/1996 | TenEyck et al. |
| 5,666,726 A | 9/1997 | Robinson et al. |
| 5,703,147 A | 12/1997 | Martin et al. |
| 5,714,421 A | 2/1998 | Olds et al. |
| 5,736,109 A | 4/1998 | Howorth et al. |
| 5,811,063 A | 9/1998 | Robinson et al. |
| 5,811,360 A | 9/1998 | Jubb |
| 5,821,183 A | 10/1998 | Jubb |
| 5,853,675 A | 12/1998 | Howorth |
| 5,862,590 A | 1/1999 | Sakashita et al. |
| 5,869,010 A | 2/1999 | Langer |
| 5,874,375 A | 2/1999 | Zoitos et al. |
| 5,882,608 A | 3/1999 | Sanocki et al. |
| 5,928,075 A | 7/1999 | Miya et al. |
| 5,928,975 A | 7/1999 | Jubb |
| 5,955,177 A | 9/1999 | Sanocki et al. |
| 5,955,389 A | 9/1999 | Jubb |
| 6,000,131 A | 12/1999 | Schmitt |
| 6,025,288 A | 2/2000 | Zoitos et al. |
| 6,030,910 A | 2/2000 | Zoitos et al. |
| 6,051,193 A | 4/2000 | Langer et al. |
| 6,101,714 A | 8/2000 | Schmitt |
| 6,158,120 A | 12/2000 | Foster et al. |
| 6,162,404 A | 12/2000 | Tojo et al. |
| 6,183,852 B1 | 2/2001 | Rorabaugh et al. |
| 6,231,818 B1 | 5/2001 | TenEyck |
| 6,317,976 B1 | 11/2001 | Aranda et al. |
| 6,444,287 B1 | 9/2002 | Kalb |
| 6,468,932 B1 | 10/2002 | Robin et al. |
| 6,551,951 B1 | 4/2003 | Fay et al. |
| 6,589,488 B1 | 7/2003 | Eyhorn |
| 6,725,656 B2 | 4/2004 | Moore, III et al. |
| 6,726,884 B1 | 4/2004 | Dillon et al. |
| 6,737,146 B2 | 5/2004 | Schierz et al. |
| 6,756,107 B1 | 6/2004 | Schierz et al. |
| 6,855,298 B2 | 2/2005 | TenEyck |
| 6,861,381 B1 | 3/2005 | Jubb et al. |
| 6,923,942 B1 | 8/2005 | Shirk et al. |
| 6,953,757 B2 | 10/2005 | Zoitos et al. |
| 7,033,412 B2 | 4/2006 | Kumar et al. |
| 7,152,633 B2 | 12/2006 | White |
| 7,153,796 B2 | 12/2006 | Jubb et al. |
| 7,259,118 B2 | 8/2007 | Jubb et al. |
| 7,261,864 B2 | 8/2007 | Watanabe |
| 7,273,129 B2 | 9/2007 | Harwood |
| 7,387,822 B2 | 6/2008 | Dinwoodie |
| 7,550,118 B2 | 6/2009 | Merry |
| 7,610,936 B2 | 11/2009 | Spohn et al. |
| 7,611,503 B2 | 11/2009 | Spohn et al. |
| 7,820,117 B2 | 10/2010 | Peisert et al. |
| 7,858,051 B2 | 12/2010 | Sako |
| 7,887,917 B2 | 2/2011 | Zoitos et al. |
| 7,971,357 B2 | 7/2011 | Ten Eyck et al. |
| 8,080,210 B2 | 12/2011 | Hornback, III |
| 8,124,022 B2 | 2/2012 | Howorth et al. |
| 8,404,187 B1 | 3/2013 | Fernando et al. |
| 8,673,229 B2 | 3/2014 | Howorth |
| 2001/0036427 A1 | 11/2001 | Yamada et al. |
| 2002/0025904 A1 | 2/2002 | Goto et al. |
| 2002/0127154 A1 | 9/2002 | Foster et al. |
| 2003/0049180 A1 | 3/2003 | Fukushima |
| 2003/0185724 A1 | 10/2003 | Anji et al. |
| 2004/0052694 A1 | 3/2004 | Nishikawa et al. |
| 2004/0134172 A1 | 7/2004 | Kumar et al. |
| 2004/0234436 A1 | 11/2004 | Howorth |
| 2005/0272602 A1 | 12/2005 | Ninomiya |
| 2006/0153746 A1 | 7/2006 | Merry et al. |
| 2006/0154040 A1 | 7/2006 | Merry |
| 2006/0278323 A1 | 12/2006 | Eguchi |
| 2007/0020454 A1 | 1/2007 | Zoitos et al. |
| 2007/0065349 A1 | 3/2007 | Merry |
| 2007/0161970 A1 | 7/2007 | Spohn et al. |
| 2007/0207069 A1 | 9/2007 | Kariya et al. |
| 2008/0086087 A1 | 4/2008 | Spohn et al. |
| 2008/0154214 A1 | 6/2008 | Spohn et al. |
| 2008/0169038 A1 | 7/2008 | Sellis et al. |
| 2008/0193788 A1 | 8/2008 | Nakama |
| 2008/0206114 A1 | 8/2008 | Hornback, III |
| 2008/0253939 A1 | 10/2008 | Hornback |
| 2009/0060800 A1 | 3/2009 | Fernandes |
| 2009/0060802 A1 | 3/2009 | Beauharnois |
| 2009/0114097 A1 | 5/2009 | Saiki |
| 2009/0208384 A1 | 8/2009 | Merry |
| 2009/0208385 A1 | 8/2009 | Howorth et al. |
| 2009/0304560 A1 | 12/2009 | Dietz |

(56) References Cited

U.S. PATENT DOCUMENTS

| | | | |
|---|---|---|---|
| 2010/0173552 A1* | 7/2010 | Fernando | C04B 35/117 442/414 |
| 2010/0207298 A1 | 8/2010 | Kunze et al. | |
| 2010/0209306 A1 | 8/2010 | Kunze et al. | |
| 2011/0232243 A1 | 9/2011 | De Rovere et al. | |
| 2012/0171457 A1* | 7/2012 | De Rovere | B01D 39/2024 428/292.1 |
| 2015/0000259 A1 | 1/2015 | Dietz | |

FOREIGN PATENT DOCUMENTS

| | | |
|---|---|---|
| EP | 0 319 299 A2 | 6/1989 |
| EP | 0 508 751 A1 | 10/1992 |
| EP | 0 551 532 A1 | 7/1993 |
| EP | 0 643 204 A2 | 3/1995 |
| EP | 0 765 933 A1 | 4/1997 |
| EP | 0 803 643 A1 | 10/1997 |
| EP | 1 495 807 A1 | 1/2005 |
| EP | 1 696 110 A1 | 8/2006 |
| EP | 1 905 895 A1 | 4/2008 |
| EP | 1 931 862 A1 | 6/2008 |
| EP | 1 950 035 A1 | 7/2008 |
| GB | 1 438 762 A | 6/1976 |
| GB | 1 513 808 | 6/1978 |
| GB | 2 200 129 A | 7/1988 |
| JP | 4-083773 | 3/1992 |
| JP | 6-272549 | 9/1994 |
| JP | 7-286514 | 10/1995 |
| JP | 2002-47070 A | 2/2002 |
| JP | 2002-338300 A | 11/2002 |
| JP | 2014-535021 A | 12/2014 |
| WO | WO 91/11498 A1 | 8/1991 |
| WO | WO 97/32118 A1 | 9/1997 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2008/103525 A2 | 8/2008 |
| WO | WO 2008/154078 A1 | 12/2008 |
| WO | WO 2008/156942 A1 | 12/2008 |

OTHER PUBLICATIONS

Tosa Shin'Ichi, et al., "The Development of Converter Canning Technology for Thin Wall Substrate." Honda R&D Tech. Rev., vol. 12, No. 1, pp. 175-182, Japan (2000).

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.

Maret, Gulati, Lambert & Zink. Systems Durability of a Ceramic Racetrack Converter. International Fuels and Lubricants Meeting, Toronto, Canada, Oct. 7-10, 1991.

Product Brochure—"There's More to it Than You Think. HDK— Pyrogenic Silica", Wacker Silicones, 6173/10.05/e, Oct. 2005.

Technical Data Sheet—"HDK N20 Pyrogenic Silica", Wacker Silicones, Version 1.0, Jun. 12, 2008.

ASTM Standard C 177, 1985 (1993), "Test-Method for Steady-State Heat Flux Measurements and Thermal Transmission Properties by Means of the Guarded-Hot-Plate Apparatus," ASTM International, West Conshohocken, PA, 1993.

Office Action mailed on Jun. 26, 2012 for U.S. Appl. No. 12/648,903.

Office Action mailed on Nov. 2, 2012 for U.S. Appl. No. 12/648,903.

Office Action mailed on Oct. 31, 2014 for U.S. Appl. No. 12/648,903.

Office Action mailed on Apr. 3, 2015 for U.S. Appl. No. 12/648,903.

PCT/US2015/048566—International Search Report, mailed Dec. 18, 2015.

PCT/US2015/048566—International Written Opinion, mailed Dec. 18, 2015.

* cited by examiner

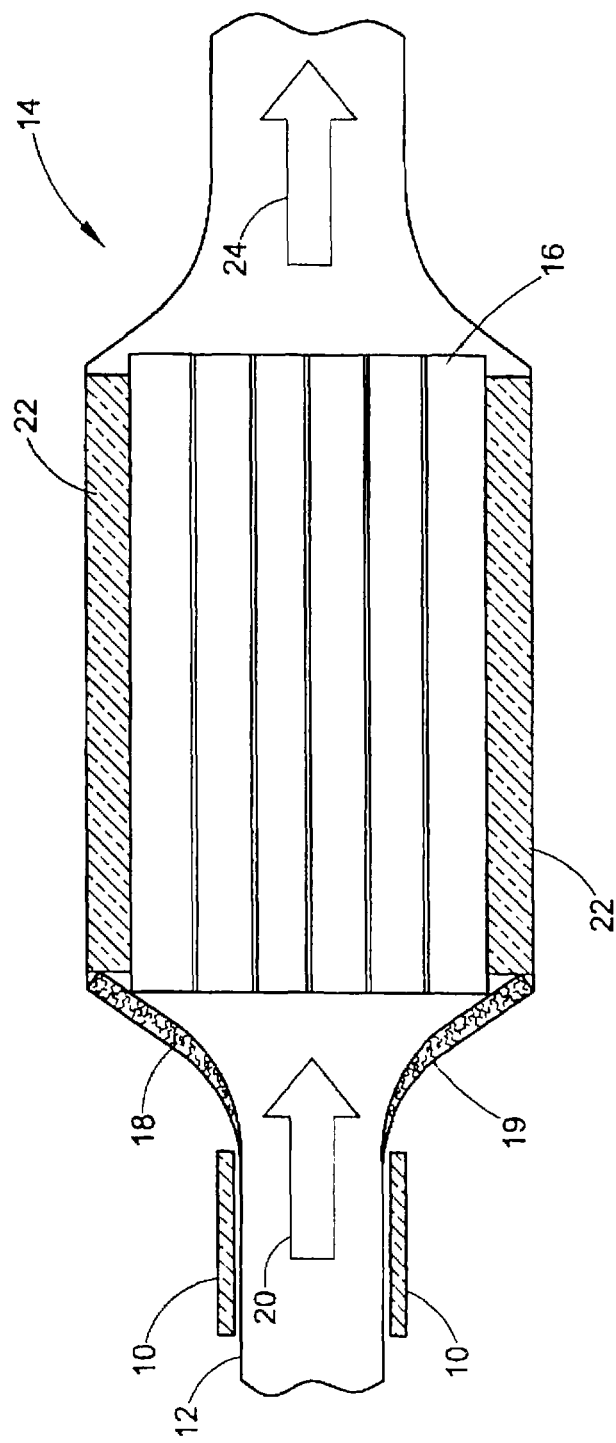

HIGH TEMPERATURE RESISTANT INSULATION MAT

This application claims the benefit of the filing date under 35 U.S.C. §119(e) from United States Provisional Application for Patent Ser. No. 62/120,133, filed on Feb. 24, 2015, and United States Provisional Application for Patent Ser. No. 62/183,368, filed on Jun. 23, 2015.

Provided are methods of forming insulation mats and insulation mats suitable for use in automotive exhaust systems.

Exhaust gas treatment devices, such as catalytic converters, diesel particulate filters, or catalyzed diesel particulate filters, are conventionally included in the exhaust systems of automotive vehicles to reduce the amount of pollutants discharged to the environment. While exhaust gas treatment devices used today perform satisfactorily once their light-off temperature is reached, a pollution problem exists during the light-off period. For example, it has been determined that the majority of the pollutants exhausted to the environment from an automotive exhaust system which includes an exhaust gas treatment device are exhausted during the light-off period.

As used herein, the light-off temperature is the temperature at which an exhaust gas treatment device is capable of processing a stream of exhaust gas, such that upon exiting the exhaust gas treatment device, the stream of exhaust gas complies with local regulations and/or industry conventions. The light-off period is the time required for the exhaust gas treatment device to reach its light-off temperature.

If the heat of exhaust gases traveling from the engine to the exhaust gas treatment device can be retained for a longer period of time than in conventional exhaust systems, the time required for the light-off temperature to be reached will be reduced. This would reduce the duration of time that exhaust pollutants pass through the exhaust system without being removed or altered, and in turn would reduce the amount of pollutants released to the environment.

The use of an insulated automotive exhaust system pipe to retain the heat of exhaust gases, at least prior to their contacting the exhaust gas treatment device, would reduce the light-off period and would be beneficial in reducing the amount of pollutants discharged to the environment. For example, an insulated exhaust pipe may be used in an automotive exhaust system to connect the engine to the exhaust gas treatment device.

It is known to insulate automotive engine exhaust pipes by utilizing a concentric tube-in-tube structure, with the space between the tubes containing insulation material. It is has also been proposed to utilize an insulation blanket or mat outside of the exhaust pipe. Mats proposed for this use include mats composed of silica fibers, glass fibers, or polycrystalline alumina fibers.

Silica fiber mats, however, have a limited temperature resistance and shrink to an undesirable degree when exposed to elevated temperatures. Glass fiber mats, particularly E-glass fiber mats, also have limited temperature resistance. Both silica fiber mats and glass fiber mats have poor basis weight and thickness tolerances. Polycrystalline alumina fiber mats are generally much more expensive than other types of mats.

What is needed is an insulation mat that is relatively low in cost and which exhibits low shrinkage and desired insulative properties across a wide range of operating temperatures.

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

FIG. 1 is a schematic, cross-sectional view of a portion of an automotive exhaust gas system.

Provided is a method of forming an insulation mat comprising: providing a mixture of fibers comprising first inorganic fibers and second inorganic fibers, wherein the first inorganic fibers shrink by no more than about 2 percent and the second inorganic fibers shrink from about 5 to about 15 percent, optionally from about 6 to about 15 percent, optionally from about 7 to about 15 percent, optionally from about 8 to about 15 percent, optionally from about 9 to about 15 percent, optionally from about 10 to about 15 percent, optionally from about 11 to about 15 percent, optionally from about 12 to about 15 percent, further optionally from about 13 to about 15 percent, when the mixture of fibers is heat treated at a temperature of about 500° C. to about 800° C., optionally for at least about 3 minutes; wet-forming a web of fibers from the mixture of fibers; entangling the web of fibers to form an insulation mat; heat-treating the insulation mat at a temperature of about 500° C. to about 800° C. for at least about 3 minutes; and drying the web of fibers and/or the insulation mat after said wet-forming and prior to or during said heat treating; and wherein the insulation mat comprises substantially no non-fibrous binder material prior to said heat treating the insulation mat.

Provided is a method of forming an insulation mat comprising: providing a mixture of fibers comprising first inorganic fiber and second inorganic fibers, wet-forming a web of fibers from the mixture of fibers; entangling the web of fibers to form an insulation mat; heat-treating the insulation mat for a length of time and at a temperature such that the insulation mat has a tensile strength of from about 40 kPa to about 110 kPa, optionally from about 80 kPa to about 105 kPa, after said heat treating; and drying the web of fibers and/or the insulation mat after said wet-forming and prior to or during said heat treating; and wherein the insulation mat comprises substantially no non-fibrous binder material prior to said heat treating the insulation mat.

Without limitation, the shrinkage of the fibers may be determined by creating a mat or sheet consisting essentially of the fiber for which shrinkage is to be determined. The mat or sheet is then heat treated to the desired temperature for the desired amount of time. The occupied volume before and after heat treatment are determined, and the difference between the two is the amount of shrinkage or expansion. A shrinkage/expansion percentage is determined by dividing the difference between the occupied volumes before and after heat treatment by the occupied volume prior to heat treatment.

Including fibers which shrink when heat treated, such as the second inorganic fibers mentioned in the previous paragraph, with fibers which do not shrink nearly as much when heat treated to about the same temperature, such as the first inorganic fibers mentioned in the previous paragraph, provides increased tensile strength to the insulation mat due to a synergistic interaction between the fibers. For example, heat treating an insulation mat which includes only fibers which shrink, would not result in significantly increased tensile strength as compared to the insulation mat prior to heat treatment. The synergistic interaction and resulting improved physical properties of the insulation mat allow the insulation mat to have the desired performance characteristics at lower densities and higher temperature resistances than conventional insulation mats used for the same purpose. Furthermore, it has surprisingly been found that heat treating the mixture of fibers provides the synergistic interaction, but heat treating the fibers prior to mixing does not provide the same results.

Without wishing to be limited by theory, it is believed that the second inorganic fibers, which may be longer and larger in average diameter than the first inorganic fibers, are preferentially oriented into the z-direction of the insulation mat during the entangling step, and relatively few of the first inorganic fibers are oriented into the z-direction of the insulation mat during the entangling step. The second inorganic fibers thus form a fiber web throughout the insulation mat. During heat treatment, the second inorganic fibers shrink more than the first inorganic fibers, tightening the web of second inorganic fibers throughout the insulation mat and providing increased strength to the mat. It is believed that the increased strength is produced because the second inorganic fibers shrink around the first inorganic fibers, which shrink very little in comparison to the second inorganic fibers, causing the second inorganic fibers to become somewhat taut. If the second inorganic fibers and the first inorganic fibers were to shrink to a similar degree, it is believed that the tensile strength of the insulation mat would not be improved to the degree noticed in the subject insulation mat. Furthermore, this indicates that, in certain embodiments, the entangling step is required to produce the improved tensile strength of the subject insulation mat. By the "z-direction" of the insulation mat, what is meant is any direction which deviates from parallel to the major surfaces of the insulation mat.

Once again without wishing to be limited by theory, it is also believed that, independent of whether or to what extent the first inorganic fibers may or may not shrink, heat treating the second inorganic fibers may result in bound water being removed from the second inorganic fibers. Removal of bound water may result in improved physical properties, and may "heat set" the second inorganic fibers. By "heat set", what is meant is that, after initial heat treatment during which bound water is removed, the second inorganic fibers will not shrink significantly when experiencing high temperatures, such as those experienced during use of an insulation mat(s) as described herein.

In certain embodiments, said providing a mixture of inorganic fibers comprises mixing the first inorganic fibers with the second inorganic fibers. In certain embodiments, the first inorganic fibers are washed prior to said mixing.

In certain embodiments, said entangling the web of inorganic fibers comprises at least one of needling or hydroentangling.

In certain embodiments, said heat treating the insulation mat comprises exposing the insulation mat to temperatures of from about 500° C. to about 800° C., optionally for at least about 3 minutes, further optionally for about 5 to about 15 minutes. Heat treating the insulation mat at temperatures lower than 500° C. for less than about 15 minutes may not develop the desired tensile strength in the insulation mat. Heat treating the insulation mat at temperatures lower than about 500° C. for longer than about 15 minutes may provide the desired results, but may not be commercially viable due to the added cost associated with the longer heat treatment time. Further, heat treating the insulation mat at temperatures above about 800° C. for at least about 3 minutes may result in the insulation mat possessing undesirable brittleness. The minimum heat treatment time may be about 3 minutes, in order to bring the insulation mat up to the heat treatment temperature to provide the desired properties.

In certain embodiments, such as when the second inorganic fibers comprise silica fibers, said heat treating the insulation mat may comprise exposing the insulation mat to temperatures of from about 700° C. to about 800° C., optionally for at least about 3 minutes, further optionally for about 5 to about 15 minutes. Heat treating the insulation mat comprising silica fibers at temperatures lower than 700° C. for less than about 15 minutes may not develop the desired tensile strength in the insulation mat. Heat treating the insulation mat comprising silica fibers at temperatures lower than about 700° C. for longer than about 15 minutes may provide the desired results, but may not be commercially viable due to the added cost associated with the longer heat treatment time. Further, heat treating the insulation mat comprising silica fibers at temperatures above about 800° C. for at least about 3 minutes may result in the insulation mat possessing undesirable brittleness. The minimum heat treatment time may be about 3 minutes, in order to bring the insulation mat up to the heat treatment temperature to provide the desired properties.

In certain embodiments, the method further comprises adding a binder to the insulation mat after said heat treating the insulation mat. In certain embodiments, the binder comprises at least one of an organic binder or an inorganic binder. In certain embodiments, the binder is added to the insulation mat in an amount of from about 1 to about 2 weight percent, based on the total weight of the insulation mat.

The organic binders may be provided as a solid, a liquid, a solution, a dispersion, a latex, or similar form. The organic binder may comprise a thermoplastic or thermoset binder, which after cure is a flexible material which may optionally be burned out of an installed insulation mat. Examples of suitable organic binders include, but are not limited to, aqueous based latexes of acrylic or (meth)acrylic, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters (such as polyvinylacetate or polyvinylbutyrate latexes).

Solvents for the binders, if needed, may include water or a suitable organic solvent, such as acetone, for the binder utilized. Solution strength of the binder in the solvent (if used) can be determined by conventional methods based on the binder loading desired and the workability of the binder system (viscosity, solids content, etc.).

Without limitation, suitable inorganic binder materials may include colloidal dispersions of alumina, silica, and/or zirconia, such as colloidal silica, colloidal alumina, colloidal zirconia, or mixtures thereof. Colloidal silica, such as those available from Nalco Chemical Company, are stable dispersions of nanometer size silica particles in water or other liquid medium. Colloidal silica particle sizes may range from about 4 to about 100 nanometers in diameter. The colloidal silica may be stabilized, such as with sodium or ammonium ions, and may have a pH range of about 2 to about 12.

Other suitable optional inorganic binder materials include calcined and/or uncalcined clay, in certain embodiments as an aid to the wet-forming process, such as but not limited to attapulgite, ball clay, bentonite, hectorite, kalininte, kyanite, montmorillonite, palygorskite, saponite, sepiolite, sillimanite, or combinations thereof. Clay inorganic binder particle sizes may be about 150 microns or less, in certain embodiments less than about 45 microns.

In certain embodiments, the first inorganic fibers are present in the mixture of fibers in an amount of at least about 80 percent by weight, optionally 85 percent by weight, further optionally at least about 87 percent by weight, further optionally at least about 88 percent by weight, further optionally at least about 90 percent by weight, further optionally at least about 95 percent by weight, based on the total dry weight of the mixture of fibers.

In certain embodiments, the first inorganic fibers have an average diameter of from about 0.5 µm to about 6 µm. In certain embodiments, the first inorganic fibers have an average diameter of from about 1 µm to about 6 µm. In certain embodiments, the first inorganic fibers have an average diameter of from about 2 µm to about 6 µm. In certain embodiments, the first inorganic fibers have an average diameter of from about 4 µm to about 5 µm. In certain embodiments, the first inorganic fibers have an average diameter of from about 1 µm to about 3.5 µm. In certain embodiments, the first inorganic fibers have an average diameter of from about 2 µm to about 2.5 µm.

In certain embodiments, the first inorganic fibers have an average length of from about 3 min to about 35 mm. In certain embodiments, the first inorganic fibers have an average length of from about 5 mm to about 25 mm.

In certain embodiments, the first inorganic fibers may comprise at least one of biosoluble fibers or refractory ceramic fibers.

In certain embodiments, the first inorganic fibers may shrink by no more than about 2 percent when heat treated at a temperature of from about 700° C. to about 800° C., optionally for at least about 3 minutes.

In certain embodiments, the second inorganic fibers are present in the mixture of fibers in an amount of up to about 20 percent by weight, optionally up to about 15 percent by weight, optionally up to about 13 percent by weight, further optionally up to about 12 percent by weight, further optionally up to about 10 percent by weight, further optionally up to about 5 percent by weight, based on the total dry weight of the mixture of fibers. In certain embodiments, including more than about 20 percent by weight of the second inorganic fibers may be undesirable, in that the synergistic effect between the second inorganic fibers and the first inorganic fibers may be disrupted if the proportion of second inorganic fibers is too high.

In certain embodiments, the second inorganic fibers have an average diameter of from about 6 µm to about 13 µm. In certain embodiments, the second inorganic fibers have an average diameter of from about 7 µm to about 11 µm. In certain embodiments, the second inorganic fibers have an average diameter of from about 9 µm to about 11 µm.

In certain embodiments, the second inorganic fibers have an average length of from about 12 mm to about 50 mm. In certain embodiments, the second inorganic fibers have an average length of from about 20 mm to about 35 mm.

In certain embodiments, the second inorganic fibers may comprise at least one of silica fibers, S-glass fibers, S2-glass fibers, E-glass fibers or fiberglass fibers.

In certain embodiments, the second inorganic fibers may shrink by about 5 to about 15 percent when heat treated at a temperature of from about 500° C. to about 800° C., optionally for at least about 3 minutes. In certain embodiments, the second inorganic fibers may shrink by about 6 to about 15 percent when heat treated at a temperature of from about 500° C. to about 800° C., optionally for at least about 3 minutes. In certain embodiments, the second inorganic fibers may shrink by about 7 to about 15 percent when heat treated at a temperature of from about 500° C. to about 800° C., optionally for at least about 3 minutes. In certain embodiments, the second inorganic fibers may shrink by about 8 to about 15 percent when heat treated at a temperature of from about 500° C. to about 800° C., optionally for at least about 3 minutes. In certain embodiments, the second inorganic fibers may shrink by about 9 to about 15 percent when heat treated at a temperature of from about 500° C. to about 800° C., optionally for at least about 3 minutes. In certain embodiments, the second inorganic fibers may shrink by about 10 to about 15 percent when heat treated at a temperature of from about 500° C. to about 800° C., optionally for at least about 3 minutes. In certain embodiments, the second inorganic fibers may shrink by about 11 to about 15 percent when heat treated at a temperature of from about 500° C. to about 800° C., optionally for at least about 3 minutes. In certain embodiments, the second inorganic fibers may shrink by about 12 to about 15 percent when heat treated at a temperature of from about 500° C. to about 800° C., optionally for at least about 3 minutes. In certain embodiments, the second inorganic fibers may shrink by about 13 to about 15 percent when heat treated at a temperature of from about 500° C. to about 800° C., optionally for at least about 3 minutes.

In certain embodiments, said mixture of fibers further comprises organic fibers, optionally in an amount of up to about 1 percent by weight, further optionally from about 0.05 to about 0.3 percent, further optionally in an amount of from about 0.1 to about 0.25 percent by weight, based on the total dry weight of the mixture of fibers, further optionally wherein the organic fibers comprise at least one of polyvinyl alcohol fibers, polyolefin fibers such as polyethylene and/or polypropylene, acrylic fibers, polyester fibers, ethyl vinyl acetate fibers, or nylon fibers.

An insulation mat prepared according to the above described method(s) is also provided. In certain embodiments, the insulation mat may have a tensile strength of from about 40 kPa to about 110 kPa, optionally from about 80 kPa to about 105 kPa. In certain embodiments, the insulation mat may have a density of from about 90 kg/m$^3$ to about 200 kg/m$^3$, optionally from about 90 kg/m$^3$ to about 150 kg/m$^3$, further optionally from about 100 kg/m$^3$ to about 150 kg/m$^3$. In certain embodiments, the insulation mat may have a basis weight of from about 400 gsm to about 5,000 gsm, optionally from about 400 gsm to about 4,000 gsm.

In certain embodiments, the insulation mat may have a thickness of from about 4 mm to about 35 mm. In certain embodiments, the insulation mat may have a 1000 cycle resiliency rating of A or B at a gap bulk density of from about 0.1 g/cm$^3$ to about 0.5 g/cm$^3$, optionally from about 0.15 g/cm$^3$ to about 0.3 g/cm$^3$, further optionally from about 0.2 g/cm$^3$ to about 0.3 g/cm$^3$. In certain embodiments, the erosion durability of the insulation mat may be less than or equal to about 0.3 cm$^3$, optionally less than or equal to about 0.08 cm$^3$, volume loss at a gap bulk density of from about 0.1 g/cm$^3$ to about 0.5 g/cm$^3$, optionally from about 0.15 g/cm$^3$ to about 0.3 g/cm$^3$, further optionally from about 0.2 g/cm$^3$ to about 0.3 g/cm$^3$. In certain embodiments, the insulation mat may be flexible enough to be wrapped around a cylinder having a diameter of from about 3 inches (7.6 cm) to about 30 inches (76 cm) without adversely affecting the physical properties of the insulation mat.

Also provided is an insulation mat comprising first inorganic fibers and second inorganic fibers, having at least one of: a tensile strength of from about 40 kPa to about 110 kPa, optionally from about 80 kPa to about 105 kPa; a density of from about 90 kg/m$^3$ to about 200 kg/m$^3$, optionally from about 90 kg/m$^3$ to about 150 kg/m$^3$, further optionally from about 100 kg/m³ to about 150 kg/m³; or a basis weight of from about 400 gsm to about 5,000 gsm, optionally from about 400 gsm to about 4,000 gsm; wherein the first inorganic fibers shrink by no more than about 2 percent and the second inorganic fibers shrink from about 5 to about 15 percent, optionally from about 6 to about 15 percent, optionally from about 7 to about 15 percent, optionally from about 8 to about 15 percent, optionally from about 9 to about 15 percent, optionally from about 10 to about 15 percent, optionally from about 11 to about 15 percent, optionally from about 12 to about 15 percent, further optionally from about 13 to about 15 percent, when the insulation mat is heat treated to a temperature of at least about 500° C.

The subject insulation mat(s) at least partially contains thermal energy within an automotive exhaust system, so as to allow exhaust gas treatment devices to function optimally. The mat contributes to the thermal management and insulation of 'hot-end' automotive exhaust systems, at least partially containing the thermal energy within the exhaust system so as to make the exhaust gas treatment more efficient within the exhaust gas treatment device.

For example, the insulation mat(s) may be used to insulate exhaust pipes used to deliver exhaust gases from an internal combustion engine to a catalytic converter in an automotive exhaust system, and may permit the exhaust gas treatment device to reach the light-off temperature in a short time, in order to maintain optimum exhaust gas treatment during operation of the engine.

The subject insulation mat(s) herein may also be used as cone insulation for an exhaust gas treatment device. For example, an exhaust gas treatment device may comprise a housing, a fragile structure positioned within the housing, a mounting mat disposed between the fragile structure and the housing, and inlet and outlet end cone assemblies for attaching exhaust pipes or conduits to the housing. Each end cone assembly may comprise an inner end cone housing, an outer end cone housing, and end cone insulation that is disposed within the gap or space between the inner and outer end cone housings. End cone insulation may be provided to at least partially prevent the radiation of heat from the end cone region of the exhaust gas treatment device and/or to protect the end cone-facing edges of the mounting mat from exposure to hot exhaust gases.

In certain embodiments, the insulation mat may be self-supporting for disposition within an end cone of an exhaust gas treatment device comprising an outer metallic cone and the self-supporting cone insulation. In these embodiments, the end cone assembly may not be provided with an inner metallic cone.

In certain embodiments, the insulation mat may also be used to thermally insulate other sections of the automotive exhaust system for safety reasons, and/or to protect and insulate the surrounding electrical and plastic components.

In certain embodiments, the first inorganic fibers are present in the mixture of fibers in an amount of at least about 80 percent by weight, optionally at least about 85 percent by weight, further optionally at least about 87 percent by weight, further optionally at least about 88 percent by weight, further optionally at least about 90 percent by weight, further optionally at least about 95 percent by weight, based on the total dry weight of the mixture of fibers.

In certain embodiments, the first inorganic fibers have an average diameter of from about 0.5 µm to about 6 µm, optionally from about 1 µm to about 6 µm, further optionally from about 2 µm to about 6 µm, further optionally from about 4 µm to about 5 µm, further optionally from about 1 µm to about 3.5 µm, further optionally from about 2 µm to about 2.5 µm.

In certain embodiments, the first inorganic fibers have an average length of from about 3 mm to about 35 mm, optionally from about 5 mm to about 25 mm.

In certain embodiments, the first inorganic fibers comprise at least one of biosoluble fibers or refractory ceramic fibers.

In certain embodiments, the first inorganic fibers may shrink by no more than about 2 percent when heat treated at a temperature of from about 700° C. to about 800° C., optionally for at least about 3 minutes.

In certain embodiments, the second inorganic fibers are present in the mixture of fibers in an amount of up to about 20 percent by weight, optionally up to about 15 percent by weight, further optionally up to about 13 percent by weight, further optionally up to about 12 percent by weight, further optionally up to about 10 percent by weight, further optionally up to about 5 percent by weight, based on the total dry weight of the mixture of fibers.

In certain embodiments, the second inorganic fibers have an average diameter of from about 6 µm to about 13 µm, optionally from about 7 µm to about 11 µm, further optionally from about 9 µm to about 11 µm.

In certain embodiments, the second inorganic fibers have an average length of from about 12 mm to about 50 mm, optionally from about 20 mm to about 35 mm.

In certain embodiments, the second inorganic fibers comprise at least one of silica fibers, S-glass fibers, S2-glass fibers, E-glass fibers or fiberglass fibers.

In certain embodiments, the second inorganic fibers may shrink by about 5 to about 15 percent, optionally about 6 to about 15 percent, optionally about 7 to about 15 percent, optionally about 8 to about 15 percent, optionally about 9 to about 15 percent, optionally about 10 to about 15 percent, optionally about 11 to about 15 percent, optionally about 12 to about 15 percent, further optionally about 13 to about 15 percent, when heat treated at a temperature of from about 500° C. to about 800° C., optionally for at least about 3 minutes.

In certain embodiments, the insulation mat may further comprise organic fibers. In certain embodiments, the organic fibers may comprise at least one of polyvinyl alcohol fibers, polyolefin fibers such as polyethylene and/or polypropylene, acrylic fibers, polyester fibers, ethyl vinyl acetate fibers, or nylon fibers. In certain embodiments, the organic fibers are present in the insulation mat in an amount of up to about 1 percent by weight, optionally from about 0.05 to about 0.3 percent by weight, further optionally from about 0.1 to about 0.25 percent by weight, based on the total dry weight of the insulation mat.

In certain embodiments, the subject insulation mat(s) may comprise at least one substantially non-expanding layer, ply or sheet of inorganic fibers. By "substantially non-expanding" it is meant that the insulation mat does not readily expand upon the application of heat as would be expected with intumescent material containing mats. Of course, some expansion of the mat does occur based upon its thermal coefficient of expansion, but the amount of expansion is insubstantial and de minimus as compared to the expansion of mats employing useful amounts of intumescent material.

The term "biosoluble inorganic fiber" refers to inorganic fibers that are soluble or otherwise decomposable in a physiological medium or in a simulated physiological medium such as simulated lung fluid, saline solutions, buffered saline solutions, or the like. The solubility of the fibers may be evaluated by measuring the solubility of the fibers in a simulated physiological medium as a function of time. Biosolubility may also be estimated by observing the effects of direct implantation of the fibers in test animals or by the examination of animals or humans that have been exposed to fibers, i.e. biopersistence. A method for measuring the biosolubility (i.e. the non-durability) of the fibers in physiological media is disclosed in U.S. Pat. No. 5,874,375 assigned to Unifrax I LLC, which is incorporated herein by reference. Other methods are suitable for evaluating the biosolubility of inorganic fibers. According to certain embodiments, the biosoluble fibers exhibit a solubility of at least 30 ng/cm$^2$-hr when exposed as a 0.1 g sample to a 0.3 ml/min flow of simulated lung fluid at 37° C. According to other embodiments, the biosoluble inorganic fibers may exhibit a solubility of at least 50 ng/cm$^2$-hr, or at least 100 ng/cm$^2$-hr, or at least 1000 ng/cm$^2$-hr when exposed as a 0.1 g sample to a 0.3 ml/min flow of simulated lung fluid at 37° C.

Another approach to estimating the biosolubility of fibers is based on the composition of the fibers. For example, Germany classifies respirable inorganic oxide fibers based on a compositional index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

Without limitation, suitable examples of biosoluble inorganic fibers that can be used to prepare an insulation mat for the various parts of an automotive exhaust system, including but not limited to downpipe insulation and end cone insulation, include those biosoluble inorganic fibers disclosed in U.S. Pat. Nos. 6,953,757; 6,030,910; 6,025,288; 5,874,375; 5,585,312; 5,332,699; 5,714,421; 7,259,118; 7,153,796; 6,861,381; 5,955,389; 5,928,075; 5,821,183; and 5,811,360; each of which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX®. Commercially available ISOFRAX fibers generally comprise the fiberization product of about 70 to about 80 weight percent silica, about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silicate fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX® fibers generally comprise the fiberization product of about 61 to about 67 weight percent silica, from about 27 to about 33 weight percent calcia, and from about 2 to about 7 weight percent magnesia.

Other suitable calcia-magnesia-silicate fibers are commercially available from Thermal Ceramics (Augusta, Ga.) under the trade designations SUPERWOOL 607 and SUPERWOOL 607 MAX. SUPERWOOL® 607 fibers comprise about 60 to about 70 weight percent silica, from about 25 to about 35 weight percent calcia, and from about 4 to about 7 weight percent magnesia, and trace amounts of alumina. SUPERWOOL® 607 MAX fibers comprise about 60 to about 70 weight percent silica, from about 16 to about 22 weight percent calcia, and from about 12 to about 19 weight percent magnesia, and trace amounts of alumina.

Refractory ceramic fibers (RCF) typically comprise alumina and silica. A suitable alumino-silicate ceramic fiber is commercially available from Unifrax I LLC (Niagara Falls, N.Y.) under the registered trademark FIBERFRAX®. The FIBERFRAX® ceramic fibers comprise the fiberization product of a melt comprising from about 45 to about 75 weight percent alumina and from about 25 to about 55 weight percent silica. The FIBERFRAX® fibers exhibit operating temperatures of up to about 1540° C. and a melting point up to about 1870° C. In certain embodiments, the alumino-silicate fiber may comprise the fiberization product of a melt comprising from about 40 weight percent to about 60 weight percent $Al_2O_3$ and from about 60 weight percent to about 40 weight percent Sift, and in some embodiments, from about 47 to about 53 weight percent alumina and from about 47 to about 53 weight percent silica.

RCF are a fiberization product that may be blown or spun from a melt of the component materials. RCF may additionally comprise the fiberization product of alumina, silica and zirconia, in certain embodiments in the amounts of from about 29 to about 31 percent by weight alumina, from about 53 to about 55 percent by weight silica, and from about 15 to about 17 weight percent zirconia. The average length of RCF fiber is in certain embodiments, in the range of from about 3 mm to 6.5 mm, typically less than about 5 mm, and the average fiber diameter range is typically from about 0.5 μm to about 14 μm.

Examples of suitable fibers which may be used as the second inorganic fiber in the subject insulation mat include fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 μm and a melting point in the range of 1500° C. to 1550° C. These fibers are heat resistant to temperatures of up to 1100° C., and are typically shot free and binder free.

The REFRASIL fibers, like the BELCOTEX fibers, are amorphous fibers high in silica content for providing thermal insulation for applications in the 1000° C. to 1100° C. temperature range. These fibers are from about 6 to about 13 µm in average diameter, and have a melting point of about 1700° C. The fibers, after leaching, typically have a silica content of about 95 percent by weight. Alumina may be present in an amount of about 4 percent by weight with other components being present in an amount of about 1 percent or less.

The PS-23(R) fibers from Polotsk-Steklovolokno are amorphous glass fibers high in silica content and are suitable for thermal insulation for applications requiring resistance to at least about 1000° C. These fibers have an average fiber length in the range of about 5 to about 20 mm and an average fiber diameter of about 9 µm. These fibers, like the REFRASIL fibers, have a melting point of about 1700° C.

In certain embodiments, the insulation mat may optionally comprise other known inorganic fibers, such as chopped continuous mineral fibers (including but not limited to basalt or diabasic fibers) and the like, suitable for the particular temperature applications desired. In certain embodiments, if included, such inorganic fibers may be added to the insulation mat in quantities of from greater than 0 to about 40 percent by weight, based on the total dry weight of the insulation mat.

In certain embodiments, the insulation mat(s) may prepared by a papermaking process, in which the fibers and a liquid (such as water) are made into a mixture or slurry. The fibrous components may be mixed at about a 0.25% to 5% consistency or solids content (0.25-5 parts solids to 99.75-95 parts liquid). The slurry may then be further diluted with a liquid, such as water, to enhance formation, and it may finally be flocculated with a flocculating agent and drainage retention aid chemicals. Other typical papermaking components or chemicals may be present, such as viscosity modifiers and the like. The flocculated mixture or slurry may be placed onto a papermaking machine to be formed into a ply or sheet of fiber containing paper. For a more detailed description of papermaking techniques, see U.S. Pat. No. 3,458,329, the disclosure of which is incorporated herein by reference. The insulation mat(s) may alternatively be formed by vacuum casting the slurry.

In certain embodiments of the process for making the subject insulation mat(s), the fibers and other desirable materials are wet-laid on a Rotoformer and thereafter processed through an entangling operation, such as a "needler". This process includes entangling the fibers so as to intertwine and entangle them. The resulting insulation mat is therefore densified and strengthened as compared to conventional insulating sheets.

In certain fiber entangling/needling operations, a lubricating liquid (such as an oil or other lubricating organic material) may be used to prevent fiber breakage and to aid in fiber movement and entanglement.

By entangling, it is meant any operation that will cause the fibers to be displaced from the horizontal within the paper or sheet, and extend for some length between the opposing surfaces of the paper or sheet. Entangling may be performed by a needling apparatus, which may include a horizontal surface on which a web of fibers is laid and/or moves, and a needle board which carries an array of downwardly extending needles. The needle board reciprocates the needles into and out of the web, and reorients some of the fibers of the web into planes substantially transverse to the surfaces of the web. The needles can push fibers through the web from one direction, or for example, by use of barbs on the needles, can both push fibers from the top and pull fibers from the bottom of the web. There may be physical entanglement of the fibers by full or partial penetration of the fiber paper or sheet by the barbed needles.

Additionally or alternatively, hydro-entangling methods may be used to intertwine and entangle the fibers. In a hydro-entanglement process, small, high intensity jets of water are impinged on a layer or sheet of loose fibers, with the fibers being supported on a perforated surface, such as a wire screen or perforated drum. The liquid jets cause the fibers, being relatively short and having loose ends, to become rearranged, with at least some portions of the fibers becoming physically entangled, wrapped, and/or intertwined around each other.

The web of fibers and/or the insulation mat may be dried in a drying oven.

In certain embodiments, the subject insulation mat(s) may be provided in roll form, or may be die cut or water jet cut. The insulation mats are operable as resilient insulating sheets in a thin profile, providing ease of handling, and in a flexible form, so as to be able to provide a total wrap of at least a portion of the exhaust gas assembly, if desired, without cracking As shown in FIG. 1, in one embodiment, the insulation mat 10 is adapted to be disposed about the external surface of an automotive exhaust pipe 12, which connects the engine with an exhaust gas treatment device 14 such as a catalytic converter, or as depicted, a diesel particulate filter (DPF), which may comprise a silicon carbide (SiC) substrate 16. The insulation mat 10 is therefore exposed to the hot end of the exhaust system, proximate to the hot exhaust gases 20 exiting the internal combustion engine (not shown).

The insulation mat 10 therefore assists in at least partially maintaining the heat of the gases 20 until they pass through the exhaust gas treatment device 14. Cone insulation 18, internal or external to the inlet connector 19 between the exhaust pipe 12 and the exhaust gas treatment device 14, may also thermally isolate the hot exhaust gases 20 from the external environment. Cone insulation 18 may comprise an insulation mat similar or identical to insulation mat 10, or may alternatively comprise a fiber composition different from the insulation mat 10.

The exhaust gases 20 pass through the exhaust gas treatment device 14, which may be mounted in the exhaust gas treatment device 14 by an insulating support mat 22. The support mat 22 may have required characteristics other than those of the insulation mat 10, but may also be similar to or the same as the insulation mat 10. As the exhaust gas 20 passes through the exhaust gas treatment device 14, they are at least partially converted to $CO_2$, $H_2O$ and $N_2$ gases 24, in order to comply with local regulations and/or industry convention.

The subject insulation mat(s) may be made with biosoluble fiber and/or refractory ceramic fibers as a major constituent, i.e. the first inorganic fibers. Even considering the presence of the second inorganic fibers, the subject insulation mat has significantly lower unit cost than the polycrystalline alumina fiber mats which are proposed for use in automotive exhaust gas system applications. The subject insulation mat exhibits significantly lower thermal shrinkage than mats prepared solely from silica and/or leached silica fiber material.

In certain embodiments, at least one binder may be added to the subject insulation mat after heat treatment for ease of handling and installation. The binder may provide a smoother, less irritating surface and may also provide flexibility. However, because the insulation mat(s) undergoes entangling, reliance on an organic binder to hold the mat together during production, installation and operation is not required or intended. Even after any organic binder present is burned out, the subject insulation mat is still held together by the entangled fiber structure of the mat. Therefore, the subject insulation mat is vibration resistant even at high temperature.

The following examples are set forth merely to further illustrate the subject insulation mat. The illustrative examples should not be construed as limiting the subject matter in any manner.

Exemplary insulation mats may be tested according to various methods in order to determine the physical properties of the exemplary insulation mats. These test methods include methods of determining tensile strength, resiliency, durability and bendability of exemplary insulation mats.

Tensile Strength Test

Tensile strength of an insulation mat specimen is determined by using a computerized machine which gradually pulls the specimen until the specimen tears or breaks, such methods being known to those of ordinary skill in the art. The tensile strength of the specimen is determined to be the amount of stress the specimen was able to withstand immediately prior to tearing or breaking, and is reported in units of pressure.

Thermal Conductivity Test

Thermal conductivity was tested according to ASTM C177-85, which is incorporated herein by reference as if fully written out below.

Resiliency Test

Insulation mat specimens may be tested to evaluate their resiliency (i.e., residual holding pressure) after 1,000 cycles as described herein. In order to complete the test a specimen is mounted in a gap to give a gap bulk density of from about 0.1 g/cm$^3$ to about 0.5 g/cm$^3$, optionally from about 0.15 g/cm$^3$ to about 0.3 g/cm$^3$, further optionally from about 0.2 g/cm$^3$ to about 0.3 g/cm$^3$. The specimen is heated to an elevated temperature, which is maintained for the duration of the test. The gap is then opened and closed a given percentage over a short period of time, to delineate one cycle. The specimen will be tested under these conditions for 1,000 cycles and the resiliency of the specimen is a measure of the holding pressure exerted by the specimen. The resiliency is then reported as a rating of A, B or C, where A is a range of resiliency which is most desirable, B is a range of resiliency which is less desirable than A, and C is a range of resiliency which is least desirable.

Durability Test

Insulation mat specimens may be tested to evaluate the erosion durability of the specimens. Specimens are die cut into sizes measuring 1.5"×2.0". The specimens are then weighed to calculate the basis weight of the insulating mat and to calculate the necessary gap to be left by the mounting plates which are positioned around the first and second major opposite facing surfaces of the insulating mat during the test. The gap left by the mounting plates is used to accommodate the gap bulk density ("GBD") or thickness of the insulating mat.

The specimens are mounted within a mounting fixture comprising two opposing mounting plates for holding the first and second major opposing facing surfaces of the insulating mat. The mounted specimens are placed in a furnace pre-heated to 600° C. The furnace is cooled down to 100° C. and reheated at 600° C. for another 30 minutes before being allowed to cool to ambient temperature. This heating results in the burning out of organic material from the insulating mat.

The mounting assembly is then removed from the furnace and placed inside an erosion durability tester. During the test, a motor operates to direct a pulsating stream of gas through an orifice within the mounting plate of the mounting fixture to an exposed portion of the specimen. The specimens are tested at an air pressure of 1.60 bar, a motor speed of 666 rpm, and ambient temperature for 50 minutes. The samples are then removed from the erosion durability tester and measured for erosion.

Measuring erosion is accomplished by filling any erosion-caused void within the samples with tabular alumina and weighing the amount of tabular alumina filled within the voids of each sample in grams. Durability is calculated using the inverse density factor of tabular alumina of 1.67 cm$^3$/g to determine the average value in volume loss measured in cubic centimeters (cm$^3$).

Bendability Test

The bendability of an insulation mat specimen is determined by wrapping the specimen around a test cylinder. Test cylinders of varying diameters may be used, in order to determine the range of bendability a specimen is capable of achieving. A specimen passes the test with regard to a specific test cylinder if there are no creases, tears or breaks in the specimen which span the entire width (axial direction of the cylinder) of the specimen.

Samples A through J were prepared using 90 percent by weight INSULFRAX® fibers and 10 percent by weight BELCOTEX® fibers. The INSULFRAX® fibers had lengths ranging from about 3 mm to about 30 mm and diameters ranging from 3 μm to about 5 μm. The BELCOTEX® fibers had an average length of about 25 mm and an average diameter of about 9 μm. Samples A through E were not needled, while Samples F through K were needled.

Samples A through J were tested to determine their tensile strength. Table 1 lists the degree of heat treatment and the tensile strength of each Sample. It is noted that the subject insulation mats are prepared in order to balance their physical properties in order to obtain an insulation mat which has physical properties, such as tensile strength, resiliency, durability and bendability, which fall within certain ranges. Therefore, tensile strength, for example, may not necessarily be maximized, but rather the tensile strength will be optimized along with other physical properties.

TABLE 1

| Sample | Heat Treatment | Tensile Strength (kPa) |
| --- | --- | --- |
| A | None | 15.6 |
| B | 200° C. for 10 min. | 13.8 |
| C | 500° C. for 10 min. | 14.5 |
| D | 700° C. for 10 min. | 12.4 |
| E | 900° C. for 10 min. | 19.3 |
| F | None | 14.5 |
| G | 200° C. for 10 min. | 15.6 |
| H | 500° C. for 10 min. | 77.9 |
| I | 700° C. for 10 min. | 74.4 |
| J | 900° C. for 10 min. | 44.8 |

Samples H and I were also tested to determine their 1000 cycle resiliency and erosion durability. Table 2 lists the degree of heat treatment, the gap bulk density ("GBD"), the tensile strength ("TS"), the resiliency ("R") and the erosion durability ("ED") of each Sample.

TABLE 2

| Sample | Heat Treatment | GBD (g/cm$^3$) | TS (kPa) | R | ED (cm$^3$) |
|---|---|---|---|---|---|
| H | 500° C. for 10 min. | 0.2 | 77.9 | B | 0.09 |
| I | 700° C. for 10 min. | 0.2 | 74.4 | A | 0.07 |

Samples K and L were prepared using 90 percent by weight INSULFRAX® fibers and 10 percent by weight BELCOTEX® fibers. The INSULFRAX® fibers had lengths ranging from about 3 mm to about 30 mm and diameters ranging from 3 μm to about 5 μm. The BELCOTEX® fibers had an average length of about 25 mm and an average diameter of about 9 μm. Samples K and L were needled and heat treated at a temperature of 750° C. for 10 minutes. Samples K and L were subjected to thermal conductivity testing according to ASTM C177-85, at gap bulk densities of 0.19 g/cm$^3$ (Sample K) and 0.21 g/cm$^3$ (Sample L). The thermal conductivity of each sample was measured at 200° C., 400° C., 600° C. and 800° C. The results of the thermal conductivity testing are shown in Table 3. It is expected that similar mats, when heat treated at temperatures of about 500° C. to about 800° C. for about 10 minutes, would show results similar to those shown in Table 3.

TABLE 3

| | Thermal Conductivity (mW/m · K) | |
|---|---|---|
| Temperature (° C.) | Sample K GBD 0.19 g/cm$^3$ | Sample L GBD 0.21 g/cm$^3$ |
| 200 | 60.3 | 63.1 |
| 400 | 74.9 | 76.1 |
| 600 | 99.8 | 103 |
| 800 | 133 | 137 |

In certain embodiments, the subject insulation mats may be differentiated from exhaust gas treatment device mounting mats. The subject insulation mat(s) may be used without having to be kept under any significant pressure. In other words, the insulation mat does not need to be compressed to a target density (gap bulk density) in order to stay intact while in operation under typical automotive exhaust system vibration and temperature conditions, particularly in 'hot-end' exhaust insulation applications. Nevertheless, in the typical operating environment, the insulation mat may have a thin covering, such as a thin sheet of metal, to protect it from impact and the general environment. However, the insulation mat need not be sealed against the outside environment. For example, in certain applications, the edges may be exposed to air or moisture.

The subject insulation mat(s) exhibits good insulation values (better than air gap), resistance to moisture and salt for durability in the automotive environment, elevated temperature resistance (up to 1000° C. or more), flexibility for ease of installation around complex shapes, and increased radial vibration durability. The subject insulation mat exhibits a high tensile strength which is sufficient to allow the mat to remain in place after exposure to high temperature. The subject mats are less expensive than high performance insulation mats such as polycrystalline alumina mats, while providing superior performance.

The subject insulation mats are useful for automotive exhaust system insulation applications, such as downpipe, manifold and muffler insulation, as well as catalytic converter inlet and outlet cone insulation. The subject insulation mats are also suitable for use as automotive heat shields. The subject insulation mats may also be used to wrap heat generating elements within fuel cells.

In a first embodiment, a subject method of forming an insulation mat may comprise: providing a mixture of fibers comprising first inorganic fibers and second inorganic fibers, wherein the first inorganic fibers shrink by no more than about 2 percent and the second fibers shrink by about 5 to about 15 percent when the mixture of fibers is heat treated at a temperature of from about 500° C. to about 800° C., optionally for at least about 3 minutes; wet-forming a web of fibers from the mixture of fibers; entangling the web of fibers to form an insulation mat; heat-treating the insulation mat at a temperature of from about 500° C. to about 800° C., optionally for at least about 3 minutes; and drying the web of fibers and/or the insulation mat after said wet-forming and prior to or during said heat treating; wherein the insulation mat comprises substantially no non-fibrous binder material prior to said heat treating the insulation mat.

The method of the first embodiment may include that said providing a mixture of inorganic fibers comprises mixing the first inorganic fibers with the second inorganic fibers, optionally wherein the first inorganic fibers are washed prior to said mixing.

The method of either or both of the first or subsequent embodiments may further include that said entangling the web of inorganic fibers comprises at least one of needling or hydro entangling.

The method of any of the first or subsequent embodiments may further include that said heat treating the insulation mat comprises exposing the insulation mat to a temperature of from about 500° C. to about 800° C. for at least about 3 minutes.

The method of any of the first or subsequent embodiments may further include that said heat treating the insulation mat comprises exposing the insulation mat to a temperature of from about 500° C. to about 800° C. for from about 5 minutes to about 15 minutes.

The method of any of the first or subsequent embodiments may further comprise adding a binder to the insulation mat after said heat treating the insulation mat, optionally wherein the binder comprises at least one of an organic binder or an inorganic binder, further optionally wherein the binder is added to the insulation mat in an amount of from about 1 to about 2 weight percent, based on the total weight of the insulation mat.

The method of any of the first or subsequent embodiments may further include that the first inorganic fibers are present in the mixture of fibers in an amount of at least about 80 percent by weight, optionally at least about 85 percent by weight, further optionally at least about 87 percent by weight, further optionally at least about 88 percent by weight, further optionally at least about 90 percent by weight, further optionally at least about 95 percent by weight, based on the total dry weight of the mixture of fibers.

The method of any of the first or subsequent embodiments may further include that the first inorganic fibers have an average diameter of from about 0.5 μm to about 6 μm, optionally from about 1 μm to about 6 μm, further optionally from about 2 μm to about 6 μm, further optionally from about 4 μm to about 5 μm, further optionally from about 1 μm to about 3.5 μm, further optionally from about 2 μm to about 2.5 μm.

The method of any of the first or subsequent embodiments may further include that the first inorganic fibers have an average length of from about 3 mm to about 35 mm, optionally from about 5 mm to about 25 mm.

The method of any of the first or subsequent embodiments may further include that the first inorganic fibers comprise at least one of biosoluble fibers or refractory ceramic fibers.

The method of any of the first or subsequent embodiments may further include that first inorganic fibers shrink by no more than about 2 percent when heat treated at a temperature of from about 500° C. to about 800° C., optionally for at least about 3 minutes.

The method of any of the first or subsequent embodiments may further include that the second inorganic fibers are present in the mixture of fibers in an amount of up to about 20 percent by weight, optionally up to about 15 percent by weight, further optionally up to about 13 percent by weight, further optionally up to about 12 percent by weight, further optionally up to about 10 percent by weight, further optionally up to about 5 percent by weight, based on the total dry weight of the mixture of fibers, optionally The method of any of the first or subsequent embodiments may further include that the second inorganic fibers have an average diameter of from about 6 µm to about 13 µm, optionally from about 7 µm to about 11 µm, further optionally from about 9 µm to about 11 µm.

The method of any of the first or subsequent embodiments may further include that the second inorganic fibers have an average length of from about 12 mm to about 50 mm, optionally from about 20 mm to about 35 mm.

The method of any of the first or subsequent embodiments may further include that the second inorganic fibers comprise at least one of silica fibers, S-glass fibers, S2-glass fibers, E-glass fibers or fiberglass fibers.

The method of any of the first or subsequent embodiments may further include that the second inorganic fibers shrink by about 5 to about 15 percent when heat treated at a temperature of from about 500° C. to about 800° C., optionally for at least about 3 minutes.

The method of any of the first or subsequent embodiments may further include that said mixture of fibers further comprises organic fibers, optionally in an amount of up to 1 percent by weight, optionally from about 0.05 to about 0.3 percent by weight, further optionally from about 0.1 to about 0.25 percent by weight, based on the total dry weight of the mixture of fibers, further optionally wherein the organic fibers comprise at least one of polyvinyl alcohol fibers, polyolefin fibers such as polyethylene and/or polypropylene, acrylic fibers, polyester fibers, ethyl vinyl acetate fibers, or nylon fibers.

In a second embodiment, a subject insulation mat may be prepared according to the method of any of the first or subsequent embodiments.

The insulation mat of the second embodiment may have a tensile strength of from about 40 kPa to about 110 kPa, optionally from about 80 kPa to about 105 kPa.

The insulation mat of either or both of the second or subsequent embodiments may have a density of from about 90 kg/m³ to about 200 kg/m³, optionally from about 90 kg/m³ to about 150 kg/m3, further optionally from about 100 kg/m3 to about 150 kg/m3.

The insulation mat of any of the second or subsequent embodiments may have a basis weight of from about 400 gsm to about 5,000 gsm, optionally from about 400 gsm to about 4,000 gsm.

In a third embodiment, a subject insulation mat comprising first inorganic fibers and second inorganic fibers, having at least one of: a tensile strength of from about 40 kPa to about 110 kPa, optionally from about 80 kPa to about 105 kPa; a density of from about 90 kg/m3 to about 200 kg/m³, optionally from about 90 kg/m³ to about 150 kg/m3, further optionally from about 100 kg/m3 to about 150 kg/m3; or a basis weight of from about 400 gsm to about 5,000 gsm, optionally from about 400 gsm to about 4,000 gsm; wherein the first inorganic fibers shrink by no more than about 2 percent and the second fibers shrink by about 5 to about 15 percent when the insulation mat is heat treated at a temperature of from about 500° C. to about 800° C., optionally for at least about 3 minutes.

The insulation mat of the first embodiment may further include that the first inorganic fibers are present in the mixture of fibers in an amount of at least about 80 percent by weight, optionally at least about 85 percent by weight, further optionally at least about 87 percent by weight, further optionally at least about 88 percent by weight, further optionally at least about 90 percent by weight, further optionally at least about 95 percent by weight, based on the total dry weight of the mixture of fibers.

The insulation mat of either or both of the first or subsequent embodiments may further include that the second inorganic fibers are present in the mixture of fibers in an amount of up to about 20 percent by weight, optionally up to about 15 percent by weight, further optionally up to about 13 percent by weight, further optionally up to about 12 percent by weight, further optionally up to about 10 percent by weight, further optionally up to about 5 percent by weight, based on the total dry weight of the mixture of fibers.

The insulation mat of any of the third or subsequent embodiments may further include that the first inorganic fibers have an average diameter of from about 0.5 µm to about 6 µm, optionally from about 1 µm to about 6 µm, further optionally from about 2 µm to about 6 µm, further optionally from about 4 µm to about 5 µm, further optionally from about 1 µm to about 3.5 µm, further optionally from about 2 µm to about 2.5 µm.

The insulation mat of any of the third or subsequent embodiments may further include that the second inorganic fibers have an average diameter of from about 6 µm to about 13 µm, optionally from about 7 µm to about 11 µm, further optionally from about 9 µm to about 11

The insulation mat of any of the third or subsequent embodiments may further include that the first inorganic fibers have an average length of from about 3 mm to about 35 mm, optionally from about 5 mm to about 25 mm.

The insulation mat of any of the third or subsequent embodiments may further include that the second inorganic fibers have an average length of from about 12 mm to about 50 mm, optionally from about 20 mm to about 35 mm.

The insulation mat of any of the third or subsequent embodiments may further include that first inorganic fibers comprise at least one of biosoluble fibers or refractory ceramic fibers.

The insulation mat of any of the third or subsequent embodiments may further include that the second inorganic fibers comprise at least one of silica fibers, S-glass fibers, S2-glass fibers, E-glass fibers or fiberglass fibers.

The insulation mat of any of the third or subsequent embodiments may further include that the first inorganic fibers shrink by no more than about 2 percent when heat treated at a temperature of from about 500° C. to about 800° C., optionally for at least about 3 minutes.

The insulation mat of any of the third or subsequent embodiments may further include that the second inorganic fibers shrink by about 5 to about 15 percent when heat treated at a temperature of from about 500° C. to about 800° C., optionally for at least about 3 minutes.

The insulation mat of any of the third or subsequent embodiments may further comprise polyvinyl alcohol fibers, optionally in an amount of from about 0.05 to about 0.3 percent by weight, optionally from about 0.1 to about 0.25 percent by weight, based on the total dry weight of the insulation mat.

The insulation mat of any of the third or subsequent embodiments may further comprise a binder, optionally wherein the binder comprises at least one of an organic binder or an inorganic binder, further optionally wherein the binder is added to the insulation mat in an amount of from about 1 to about 2 weight percent, based on the total weight of the insulation mat.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A method of forming an insulation mat comprising:
   providing a mixture of fibers comprising first inorganic fibers and second inorganic fibers, wherein the first inorganic fibers shrink by no more than about 2 percent and the second fibers shrink by about 5 to about 15 percent when the mixture of fibers is heat treated at a temperature of from about 500° C. to about 800° C., optionally for at least about 3 minutes;
   wet-forming a web of fibers from the mixture of fibers;
   entangling the web of fibers to form an insulation mat;
   heat-treating the insulation mat at a temperature of from about 500° C. to about 800° C.; and
   drying the web of fibers and/or the insulation mat after said wet-forming and prior to or during said heat treating;
   wherein the insulation mat comprises substantially no non-fibrous binder material prior to said heat treating the insulation mat.

2. The method of claim 1, wherein said providing a mixture of inorganic fibers comprises mixing the first inorganic fibers with the second inorganic fibers.

3. The method of claim 1, wherein said entangling the web of inorganic fibers comprises at least one of needling or hydroentangling.

4. The method of claim 1, wherein said heat treating the insulation mat comprises exposing the insulation mat to a temperature of from about 500° C. to about 800° C. for at least about 3 minutes.

5. The method of claim 1, further comprising adding a binder to the insulation mat after said heat treating the insulation mat.

6. The method of claim 1, wherein the first inorganic fibers are present in the mixture of fibers in an amount of at least about 80 percent by weight.

7. The method of claim 1, wherein the first inorganic fibers comprise at least one of biosoluble fibers or refractory ceramic fibers.

8. The method of claim 1, wherein the first inorganic fibers shrink by no more than about 2 percent when heat treated at a temperature of from about 500° C. to about 800° C.

9. The method of claim 1, wherein the second inorganic fibers are present in the mixture of fibers in an amount of up to about 20 percent by weight.

10. The method of claim 1, wherein the second inorganic fibers comprise at least one of silica fibers, S-glass fibers, S2-glass fibers, E-glass fibers or fiberglass fibers.

11. The method of claim 1, wherein the second inorganic fibers shrink by about 5 to about 15 percent when heat treated at a temperature of from about 500° C. to about 800° C.

12. An insulation mat prepared according to the method of claim 1.

13. The insulation mat of claim 12, having a tensile strength of from about 40 kPa to about 110 kPa.

14. The insulation mat of claim 12, having a density of from about 90 kg/m$^3$ to about 200 kg/m$^3$.

15. The insulation mat of claim 12, having a basis weight of from about 400 gsm to about 5,000 gsm.

16. An insulation mat comprising first inorganic fibers and second inorganic fibers, having at least one of:
   a tensile strength of from about 40 kPa to about 110 kPa, optionally from about 80 kPa to about 105 kPa;
   a density of from about 90 kg/m$^3$ to about 200 kg/m$^3$, optionally from about 90 kg/m$^3$ to about 150 kg/m$^3$, further optionally from about 100 kg/m$^3$ to about 150 kg/m$^3$; or
   a basis weight of from about 400 gsm to about 5,000 gsm, optionally from about 400 gsm to about 4,000 gsm;
   wherein the first inorganic fibers shrink by no more than about 2 percent and the second fibers shrink by about 5 to about 15 percent when the insulation mat is heat treated at a temperature of from about 500° C. to about 800° C.

17. The insulation mat of claim 16, wherein the first inorganic fibers are present in the mixture of fibers in an amount of at least about 80 percent by weight.

18. The insulation mat of claim 16, wherein the second inorganic fibers are present in the mixture of fibers in an amount of up to about 20 percent by weight.

19. The insulation mat of claim 16, wherein the first inorganic fibers comprise at least one of biosoluble fibers or refractory ceramic fibers.

20. The insulation mat of claim 16, wherein the second inorganic fibers comprise at least one of silica fibers, S-glass fibers, S2-glass fibers, E-glass fibers or fiberglass fibers.

21. The insulation mat of claim 16, wherein the first inorganic fibers shrink by no more than about 2 percent when heat treated at a temperature of from about 500° C. to about 800° C.

22. The insulation mat of claim 16, wherein the second inorganic fibers shrink by about 5 to about 15 percent when heat treated at a temperature of from about 500° C. to about 800° C.

* * * * *